United States Patent
Inoue

[15] 3,663,788
[45] May 16, 1972

[54] KINETIC DEPOSITION OF PARTICLES

[72] Inventor: Kiyoshi Inoue, 182, 3-chome, Tamagawayoga-Machi, Setagaya-ku, Tokyo, Japan

[22] Filed: July 29, 1970

[21] Appl. No.: 64,104

Related U.S. Application Data

[63] Continuation of Ser. No. 574,056, Aug. 22, 1966, abandoned, which is a continuation-in-part of Ser. Nos. 311,061, Sept. 24, 1963, Pat. No. 3,267,710, and Ser. No. 508,487, Nov. 18, 1965, Pat. No. 3,512,384, which is a continuation-in-part of Ser. No. 41,080, July 6, 1960, Pat. No. 3,232,085.

[30] Foreign Application Priority Data

June 11, 1966 Japan...............................41/37635
June 11, 1966 Japan...............................41/45288
July 11, 1966 Japan...............................41/45289
Aug. 19, 1966 Japan...............................41/54709
Aug. 19, 1966 Japan...............................41/54710

[52] U.S. Cl.................................................219/76
[51] Int. Cl..................................................B23k 9/04
[58] Field of Search .............219/76, 121, 149; 75/208, 226; 117/93.1, 105, 105.2

[56] References Cited

UNITED STATES PATENTS 3,371,404  3/1968  Lemelson.............................29/421 E
2,714,563  8/1955  Poorman et al........................117/105

*Primary Examiner*—J. V. Truhe
*Assistant Examiner*—J. G. Smith

[57] ABSTRACT

A method of coating a substrate in which a mass of particulate material is formed in situ or disposed between a pair of electrodes which produce a spark discharge to create a shock wave carrying the particles onto and bonding them to the substrate. The particles are activated by their presence within the discharge.

25 Claims, 16 Drawing Figures

Patented May 16, 1972

KIYOSHI INOUE
INVENTOR.

BY
Karl G. Ross
Attorney

KIYOSHI INOUE
*INVENTOR.*

Patented May 16, 1972　　　　　　　　　　3,663,788

KIYOSHI INOUE
*INVENTOR.*

BY

Kiyoshi Inoue
INVENTOR.

BY

Attorney

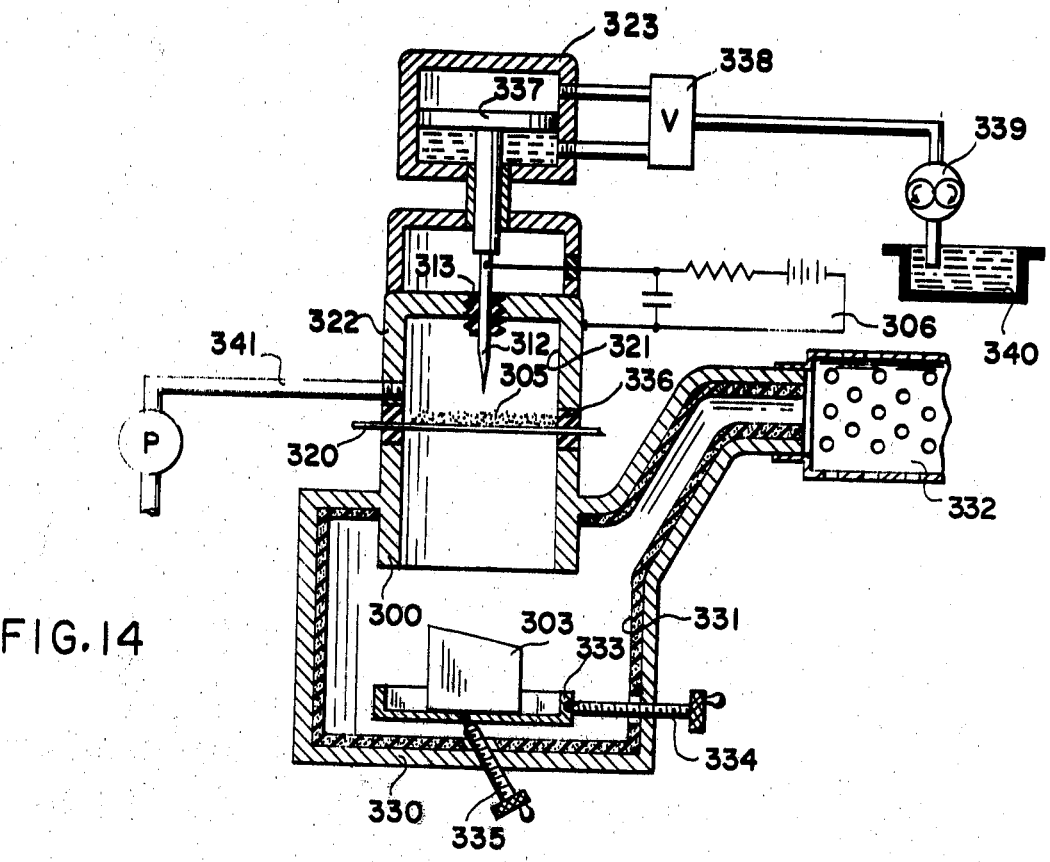
FIG. 14
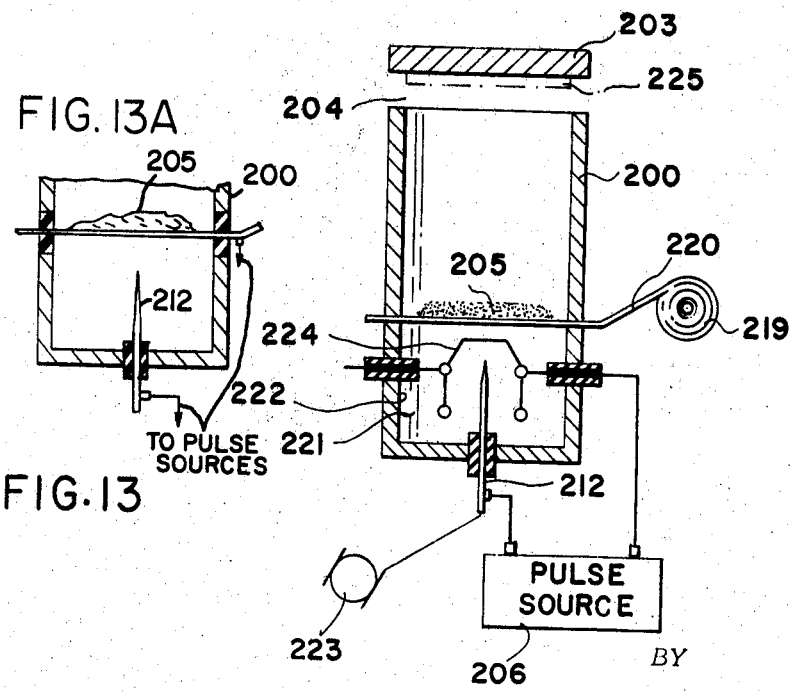
FIG. 13A
FIG. 13
KIYOSHI INOUE
INVENTOR.
BY
Karl G. Ross
Attorney

KINETIC DEPOSITION OF PARTICLES

CROSS-REFERENCE TO RELATED APPLICATIONS

This application is a continuation of my copending application Ser. No. 574,056 filed August 22 1966, now abandoned; said abandoned application is a continuation-in-part of my copending application Ser. No. 311,061, filed Sept. 24, 1963 (now U.S. Pat. No. 3,267,710) and application Ser. No. 508,487, filed Nov. 18, 1965 (now U.S. Pat. No. 3,512,384 issued May 19, 1970) as a continuation-in-part of application Ser. No. 41,080 of July 6, 1960, now U.S. Pat. No. 3,232,085, issued Feb. 1, 1966.

FIELD OF THE INVENTION

The present invention is directed to improvements in metal-forming, bonding and deposition with the aid of impulsive forces whereby pulverulent materials and especially comminuted metallic substances can be applied to a substrate.

BACKGROUND OF THE INVENTION

In application Ser. No. 311,061 (U.S. Pat. No. 3,267,710), I describe and claim a method of shaping metals and bonding metals to other bodies by impulsive action generated at least in part by an electrical discharge in a fluid. The principle of this system is that an electric discharge in a fluid, e.g., a viscous medium such as a liquid or a gas, produces a shock wave which can be transmitted to a metallic body in order to transfer the kinetic energy of the shock wave to this body and apply it against a die or use the energy to compact a mass of particles. In that application, I have pointed out that a particulate material can be converted into a coherent mass (i.e., particles of metal bonded to other metallic bodies, namely, other particles) with the aid of an impulsive shock generated by effecting a spark discharge in a closed vessel containing a liquid medium in force-wave transmitting relationship to the bodies whose kinetic energy is used to produce the bonding action. Surprisingly, the relatively instantaneous or momentary development of a shock within a body of fluid is found to give rise to a Shock wave whose velocity and energy is such that, upon transfer of this energy to the particles, the particles and/or a body against which they are applied will deform at a velocity sufficient to permit bonding between them.

While the fusion of particles of a metallic powder to form a coherent structure is not new, the conventional methods of accomplishing this task have heretofore involved the provision of sufficient kinetic energy in the form of heat to effect a thermal fusion at the interface of the particles. The disadvantages of these conventional methods are well known and need not be elucidated here, except to note that they require relatively high temperatures and pressures.

In my U.S. Pat. No. 3,250,892 issued May 10, 1966 and in the copending applications Ser. No. 326,837, filed Nov. 29, 1963 now U.S. Pat. No. 3,317,705 of May 2, 1967), and Ser. No. 356,714, filed Apr. 2, 1964, (now U.S. Pat. No. 3,340,052 of Sept. 5, 1967), I disclose a method of sintering discrete particles together wherein the high pressures and extreme thermal conditions of conventional sintering methods can be avoided. In this method, electric-spark discharge is employed to provide an impulsive force which is more or less instantaneous in nature and serves to drive the particles into contact with one another at high pressures, while a discharge is propagated among the particles to cause bridging, an operation which appears to result from the transfer by the discharge of material from one particle to another. This system is highly suitable when a spark discharge can be developed between two electrode surfaces having the particles disposed therebetween; however, the power necessary for the coating of large-surface continuous bodies with the particles is not as readily available. Even prior to the aforementioned applications relating to the sintering of discrete particles to one another, I disclosed in my U.S. Pat. Nos. 3,232,085 and 3,232,086 issued Feb. 1, 1966 that impulsive shaping of metals can be carried out by using spark discharge with the discharge being propagated through a fluid medium. It has also been proposed by others, as described in U.S. Pat. No. 3,137,937 for example, to clad a continuous metallic substrate with another metal layer by spacedly juxtaposing the layer and the substrate by relatively small distances and propagating an explosion along the surface of the layer such that the latter is effectively rolled onto the substrate parallel to the layer. According to this system, a sheet explosive is applied over the full surface of the layer at which bonding is required and propagation is effected parallel to the explosive layer, the substrate and the coating layer. Such arrangements are not, however, practical for the coating of substrates with pulverulent materials.

OBJECTS OF THE INVENTION

It is the principal object of the present invention to provide an improved method of coating metallic substrate with pulverulent materials in such manner as to render the coating layer highly adherent while obviating the disadvantages of earlier coating processes.

Still another object of this invention is to provide an improved apparatus for the coating of metallic bodies with pulverulent materials.

A further object is to provide a method of and an apparatus for forming strong bonds with metallic and nonmetallic substrates and conductive and nonconductive particles.

Yet a further object of my invention is the provision of a method of coating relatively soft bodies (e.g., of steel or the like) with relatively hard surfacing layers (e.g., tungsten carbide) in such manner as to form a strong bond between the coating material and the substrate.

SUMMARY OF THE INVENTION

These objects and others which will become apparent hereinafter are attained in accordance with the present invention, by a method for the deposition of layers upon a substrate which is an extension of the principles set forth in my earlier applications and can involve the exploitation of the large amount of kinetic energy produced in an impulsive discharge.

Thus, the present invention resides in a system for the coating of metallic substrates with pulverulent materials which comprises the steps of juxtaposing a source of a detonation-type impulsive wave with a surface of the body to be coated and disposing between the body and the source, a mass of a pulverulent material, which can be harder than the substrate and even nonbondable thereto by conventional thermal methods, the powder mass being disposed in the proximity of the detonation source; the production of the detonation wave by the source drives the particles onto the substrate with sufficient velocity as to lodge then thereon with a firm bond between the layer and the substrate.

I have found also that excellent results are obtained with respect to the bonding of particles of a hard-facing material of the type set forth above or alloy steels to metallic substrates, synthetic-resin substrates or the like if the discharge source is spaced from the mass of powder which, in turn, is disposed between the source and the surface of the substrate to be coated. Thus, it is advisable to support a layer of powder upon a frangible foil, film, sleeve or sheet juxtaposed with the surface to be coated whereby the rupturable diaphragm supporting the particle layer can separate the discharge chamber from the workpiece chamber. The latter, of course, can be vented to the atmosphere to prevent the development of pressures resisting kinetic movement of the particles into bonding engagement with the workpiece and the venting means preferably includes a sound-damping muffler. In accordance with this aspect of the invention, it has been found that a significant improvement in the degree with which the particles bond to the substrate can be attained when the particles are located in the discharge compartment although, in accordance with a modification, the particle layer may be carried by the frangible diaphragm along its surface juxtaposed with the workpiece and remote from the discharge chamber. Furthermore, the frangible diaphragm preferably constitutes the counter-electrode for the discharge system and this arrangement has been observed to give excellent results when broader surfaces of a workpiece are to be coated because the particle cloud is then driven against the workpiece with a kinetic energy that, while greater in the region of local discharge, may be considered substantially uniform over the entire cross-section of the cloud for practical purposes. The discharge electrode is a needle spaced from the frangible diaphragm, which can be an aluminum foil or composed of any other suitable metal, the needle extending perpendicularly thereto.

In accordance with this aspect of the invention, it has been found desirable to provide the discharge chamber as a discharge gun whose barrel is trained upon the workpiece and receives at an intermediate location a mass of particles to be propelled thereagainst. In a horizontal position of this barrel, the particles can be introduced substantially continuously between the discharge chamber and the mouth of the barrel, while a rapid train of pulses is supplied across the electrodes so that a sequence of discharges results in an intermittent but high-rate propulsion of the particles against the workpiece surface. In vertical positions of the barrel, it has been found most practical and highly advantageous to make use of the foil-type support and counter-electrode set forth above. The needle electrode is best constituted of aluminum although zirconium, magnesium and copper have been found to rank in that order with reference to the kinetic energy transferred to the particles. Correspondingly, the foils should be constituted of these metals in the order stated. While I do not wish to be bound by any theory as to the reasons why the bonding effect and the kinetic-energy characteristics of the metal particles are determined in part by the metal from which the needle electrode and foil are constituted, it will be noted that rupture of the foil, partial vaporization of the electrode material during the discharge and the high velocity of the shock propagation permit any atoms or molecules of the electrode material to act in force-transmitting relationship with the particles to be deposited.

According to another aspect of this invention, the effective kinetic energy of the particles and the strength with which the particles bond to the surface, whether it be to a metallic or a synthetic-resin substrate, can be augmented by providing means for heating the particles to a temperature less than their fusion point prior to their propulsion against the substrate. Such heating means can include the passage of a heating current through the mass of particles in advance of the discharge, the use of external electric heating means or some equivalent source or, most advantageously, the mixing with the particles to be deposited of a substance adapted to react with these particles exothermically. Thus, aluminum oxide can be provided together with a reducing agent (e.g., iron) or magnesium with iron oxide in thermite-type reactants capable of evolving sufficient heat to improve the bonding effectiveness. It has been observed that thermite-type reactants tend to remain in a quiescient state until the generation of a spark discharge and that the reaction may occur slightly before or concurrently with dispersion of the particles so that they are heated without material interparticle fusion until they accumulate again as a layer upon the surface of the substrate.

Another factor entering into the improved bonding action appears to be the effect of the spark discharge in stripping oxide films from the particles and/or the substrate even though analysis shows no material oxide layer to be present. I have observed that practically all metallic particles have an oxide film which resists interparticle bonding as well as particle-to-substrate bonding to such an extent that high temperatures have hitherto been required to effect suitable bonding strength. While I have pointed out in my prior applications relating to the spark sintering of particles that the discharge between adjoining particles tends to strip such oxide films therefrom, it has now been discovered that an electric discharge in the region of the particles and not necessarily involving them directly may have a similar effect. It will be noted that various methods of initiating the discharge can be employed although two have been found most practical in combination with the foil-and-needle arrangement set forth earlier. In such an arrangement, the needle can either be advanced toward the foil to reduce the discharge gap (whereby an external source of pulses is not required), or the ionization conditions within the discharge compartment may be suddenly modified. This can be done effectively by directing a stream of compressed air into the chamber to stir up a cloud of the conductive particles to be deposited, whereupon a breakdown is produced. The discharge-propagated particles form a layer of considerable uniformity and highly effective surface area. Thus, when tantalum or titanium are deposited upon an aluminum foil, excellent capacitor plates are obtained. When gold or aluminum are formed as films upon a silicon wafer, excellent semiconductive materials are produced. Photoconductive cells can be made readily by deposition of lead sulfide and cadmium sulfide upon suitable substrates.

According to an important feature of this invention, the detonation source includes a pair of electrode elements adapted to define between them an electric-discharge gap, the pulverulent material being disposed in close proximity to the gap and advantageously surrounding it. The gap can be temporarily bridged by a fusible element which is disintegrated upon discharge of a high-energy pulse across the gap and serves to lengthen the effective time of discharge as a consequence of the delayed opening of the gap. As described in U.S. Pat. Nos. 3,232,085 and 3,232,086, a shock wave is propagated through the fluid medium between the source and the substrate of a high velocity sufficient to deform a workpiece, but here used to bond particles to a workpiece surface. I have found that, earlier teachings regarding the necessity that the propagation of the explosive wave be parallel to the surface notwithstanding, excellent results are obtained when the particles are disposed in the immediate region of the detonation source and the viscosity of the surrounding medium is reduced (e.g., by evacuating the region of the detonation). Powders having a particle size ranging between 0.2 microns and 0.2 mm are suitable for the practice of the present invention while the distance of the source from the substrate varies as a function of the applied energy. When a discharge of 3,000 joules is employed, for example, in an atmospheric medium but at a reduced pressure of $10^{-2}$/mm Hg, the detonation source should be about 15 mm from the workpiece. It has been found that the shock wave and, therefore, the particles accelerated thereby should attain a minimum velocity of about 10 m/sec, although the effectiveness of bonding falls off sharply below 100 m/sec and velocities as high as 10 km/sec are suitable. The particles may be composed of relatively hard metals or metallic substances among which the most preferable are tungsten carbide, titanium carbide, boron carbide, nickel, copper and iron. Almost any suitable substrate may be employed (e.g., steel, nickel, copper and its alloys, synthetic resin, etc.). Nonmetallic particles of diamond, silicon carbide, aluminum nitride, boron nitride, lead sulfide, cadmium sulfide and the like can also be readily bonded to these substrates. Other useful powders include $Al_2O_3$, $SiO_2$, $PbO_2$ and $ZnO$, all of which can react with oxidizable metals in exothermic processes as mentioned above.

According to yet another feature of this invention, the shock wave, entraining the particles at high velocity in the direction of the workpiece, is concentrated in this direction by suitable deflection means (e.g., mechanical reflectors or electromagnetic devices taking advantage of the fact that the particles are magnetically permeable and the detonation wave generally contains ionized or charged particles produced by the detonation). It has been found to be advantageous to provide a high-frequency electric field across the region in which propagation takes place.

DESCRIPTION OF THE DRAWING

The above and other objects, features and advantages of the present invention will become more readily apparent from the following description, reference being made to the accompanying drawing in which:

FIG. 13 is an axial cross-sectional view of a vertical-barrel particle-deposition gun somewhat in diagrammatic form;

FIG. 13A represents a modification of the latter structure;

FIG. 14 is an axial cross-sectional view of another gun arrangement in which the particles are projected downwardly.

SPECIFIC DESCRIPTION AND EXAMPLES

Figure 1:
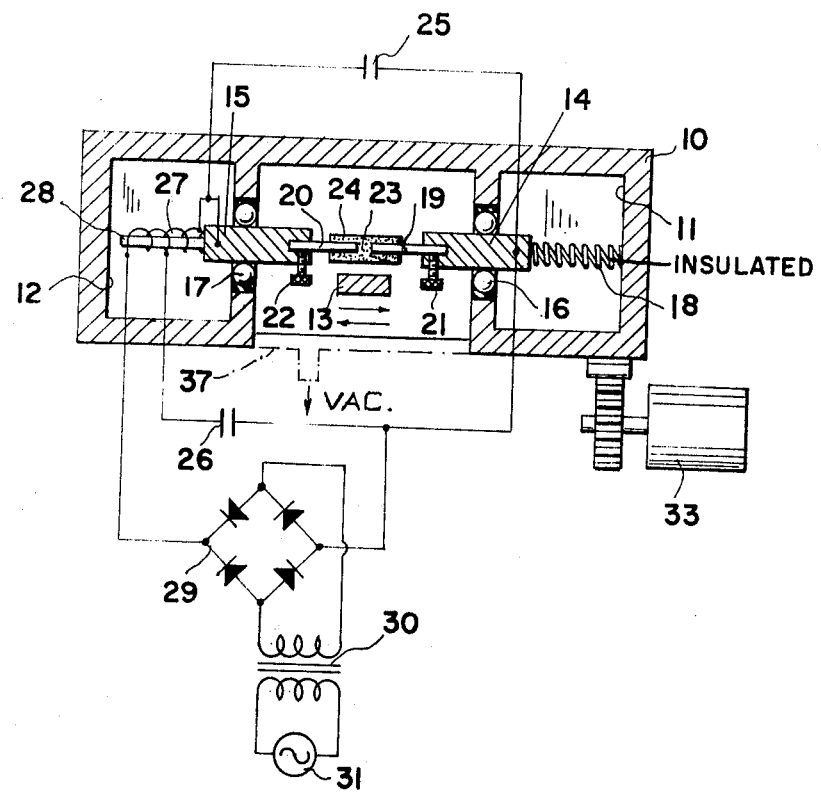
FIG. 1 is a vertical cross-sectional view, in diagrammatic form, showing an apparatus for depositing particulate materials upon a workpiece.

In FIG. 1, I show a housing 10 whose compartments 11 and 12 on opposite sides of a workpiece 13 contain electrode supports 14 and 15, respectively. The supports 14, 15 are horizontally displaceable within respective bearings 16, 17 against the force of restoring spring 18, and carry spark-discharge electrodes 19, 20 via locking screws 21, 22. The electrodes 19 and 20 define a discharge gap 23 between them and are surrounded by a mass 24 of particles to be coated onto the workpiece 13. The latter is disposed below the detonation source constituted by the electrodes. A capacitor 25 is bridged across the electrode holders 14, 15 together with a parametrically energizable capacitor 26, the parametric transformer being constituted by a solenoid coil 27 surrounding the armature 28 rigid with the electrode holder 15. A full-wave rectifier bridge 29 is connected across the secondary winding of a power transformer 30 supplied with current by the a.c. source 31 and energizes the low-turn portion of the solenoid 27. A servomotor 33 is provided to sweep the detonation source along the surfaces of the workpiece 13 perpendicularly to the plane of the drawing. Any conventional servodevice is suitable for this purpose.

When alternating current is applied at 31 to transformer 30, the capacitors 25 and 26 are charged via the respective windings of the solenoid 27. When a sufficiently high potential is attained for a breakdown of the gap 23, a spark jumps between the electrodes 19 and 20 and the resulting impulsive force or detonation drives the pulverulent material into the workpiece 23. The discharge of capacitor 25, for example, draws current through the solenoid 27 and effects a lateral oscillation of the assembly against the force of spring 18, capacitor 26 further sustaining the discharge and promoting oscillation while lengthening the duration of the detonation. This oscillation increases the area of the workpiece 13 swept by the detonation wave.

Figure 2:
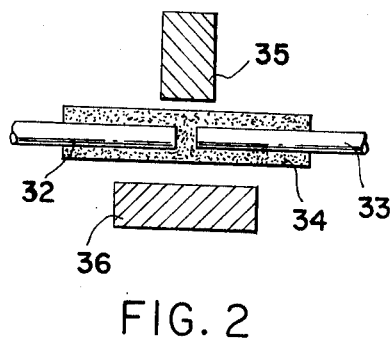
FIG. 2 is a diagrammatic sectional view showing a modified apparatus.

In FIG. 2, I show a modification wherein the electrode 32, 33, surrounded by the pulverulent material 34 is juxtaposed with a further body 35 in line with the gap. Either the workpiece 36 or this further body 35 can constitute a reflector redirecting the shock wave and making maximum use of the discharge. Similarly, either one of these two elements can be the workpiece upon which the pulverulent material is deposited. A partition 37 (dot-dash lines in FIG. 1) can close the compartment 38 in the housing and enable it to be evacuated for low-pressure deposition. Additionally, nonoxidizing gases (e.g., nitrogen) can be employed as the medium within the compartment.

Figure 3:
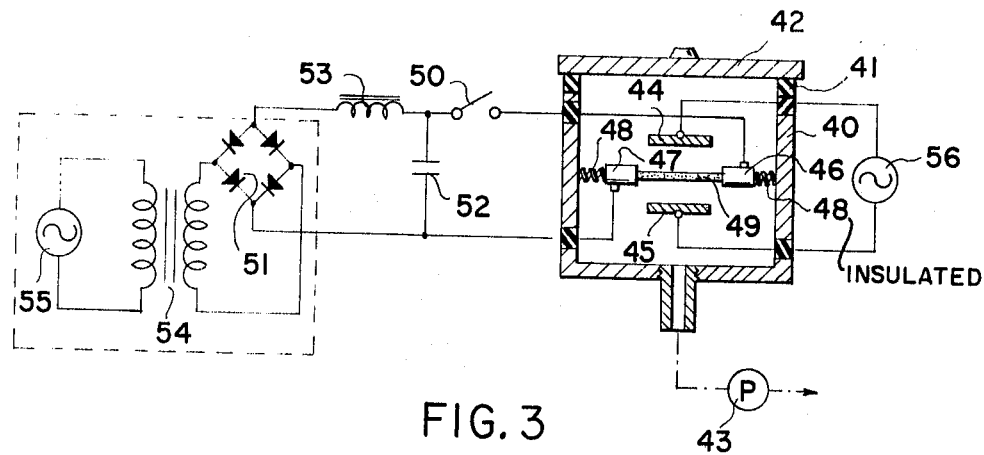
FIG. 3 is a view similar to FIG. 1 wherein, however, a high-frequency field is employed concurrently.

In the system of FIG. 3, the vessel 40 is closed by a seal 41 and a cover 42 while a suction pump 43 serves to reduce the pressure within the vessel. The vessel contains a pair of spaced-apart plates 44, 45, constituting the workpiece and disposed on opposite sides of a detonation source constituted by a pair of electrodes 46, 47 urged inwardly by respective springs 48. The mass of particles is here constituted as a relatively narrow tube 49 of powder through the interior of which a discharge can be initiated upon closure of switch 50. Here again the discharge source extends parallel to the surfaces of the workpiece 44, 45 to be coated so that the shock wave is generally transverse to these surfaces. A direct-current bridge 51 charges the capacitor 52 via a surge-suppressing inductance 53 upon energization by the power transformer 54 and the a.c. source 55. A high-frequency direct-current source 56 connected with the plates 44, 45 facilitates the deposition of the powder and improves the structure of the deposit. The high-frequency signal can range between about 1 kc/sec to about 10 mc/sec.

Figure 4:
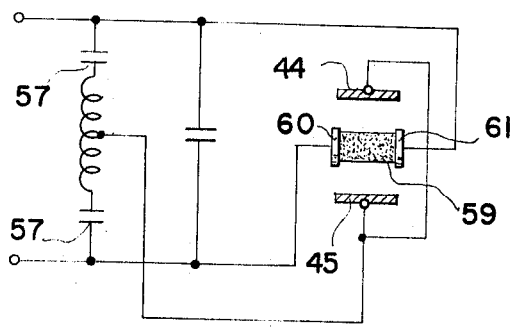
FIG. 4 shows a modified circuit arrangement for the system of FIG. 3.
Figure 5:
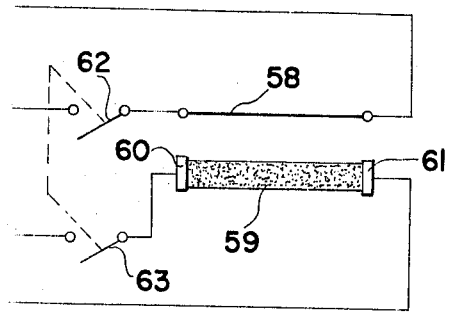
FIG. 5 is a fragmentary elevational view showing still another modification of the detonation source.

In FIG. 4, a similar arrangement is shown, except that the a.c. or high-frequency generator 56 is provided by a pair of resonant networks 57 formed on opposite sides of the inductance center tap and connected with the plates 44, 45. Since these electrodes are now at the same polarity, the high-frequency field produced upon discharge across the gap is applied between the body of powder and the plates. The shock waves of FIGS. 3 and 4 can be augmented by disposing a fusible wire 58 parallel to the powder rod 59 between the electrodes 60, 61 (FIG. 5); the system is otherwise identical with that of FIG. 3. The ganged switches 62, 63 fulfill the function of switch 50 of FIG. 3 and are adapted to discharge the capacitor 52 joined through the spark gap and the fusible wire which is disposed on the side of the rod 59 opposite the workpiece. The shock waves from wire fusion and arc discharge thus supplement one another in driving the powder across the gap. This system is an improvement over the mere spark discharge with respect to the quantity of powder affixed to the substrate per unit of power consumed.

Figure 6:
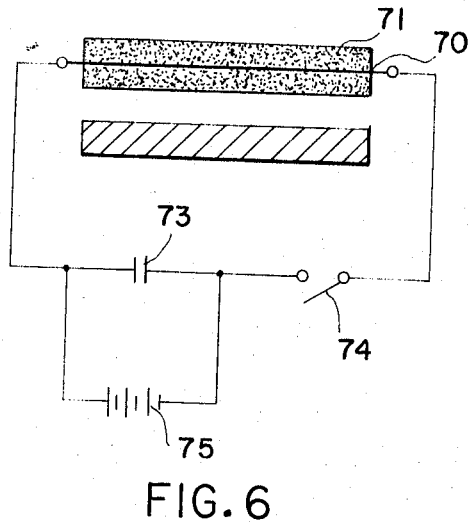
FIG. 6 is a view similar to FIG. 5, illustrating the use of a fusible wire within the body of particulate material.
Figure 7:
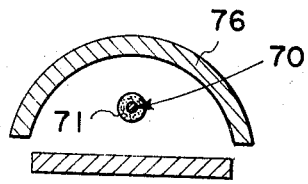
FIG. 7 is a transverse cross-sectional view through yet another modification of the source, provided with reflector means.

A still more efficient system results when the fusible wire is surrounded by the mass of particles as shown in FIG. 6. Here, the fusible wire 70 is surrounded by a tubular mass 71 of the particles to be bonded to the substrate 72. A capacitor 73 can be discharged through the wire 70 to disintegrate it when switch 74 is closed, a battery 75 being provided to charge the capacitor 73. Again means can be provided for oscillating the detonation source with respect to the workpiece or otherwise displacing the source and workpiece relatively to obtain maximum powder coverage. The system of FIG. 6 can, moreover, be provided with a downwardly concave (e.g., parabolic) reflector 76 with the rod 70 disposed at the focus. An excellent distribution of the powder is obtained in such a system while the depositing efficiency is improved (FIG. 7). When the mechanical deflection is replaced by an electromagnetic deflection of the shock wave, the magnetic means 77 (FIG. 8) is oriented so that its field is applied transversely to the detonation source 78 and the workpiece 79 but in the plane of the detonation source. Highly suitable results are obtained when the detonation force includes a fusible wire 80 connected in series with the electromagnet 77 across the capacitor 81. A switch 82 permits discharge of the capacitor through the series arrangement and allows charging of the capacitor by the battery 83 when the switch is open. In this case, no difficulties are encountered in synchronizing the pulsed magnetic field with the discharge. As can be seen from FIGS. 1 – 6, the pulverulent mass in part lies in a straight-line path between the electrodes.

It should be noted that the pulverulent mass can be held in the region of the discharge or fusible wire by a loose-bonding agent (e.g., a synthetic resin) admixed with the powder, or by a retaining tube or structure of a synthetic resin, paper or the like, with the latter method being preferred. It has been found that the presence of an extraneous substance like the resin tube does not affect the resin form of deposition which takes place whether such a tube is provided or the particles are held in place by some other means. Thus it is also conceivable that the powder will completely fill the gap.

EXAMPLE I

Figure 9:
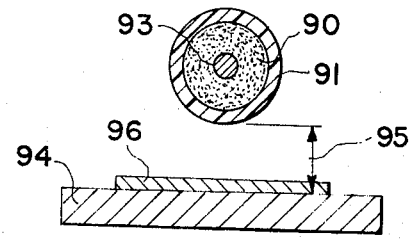
FIG. 9 is an illustration of the arrangement of the present invention as used in Example I.
Figure 10:
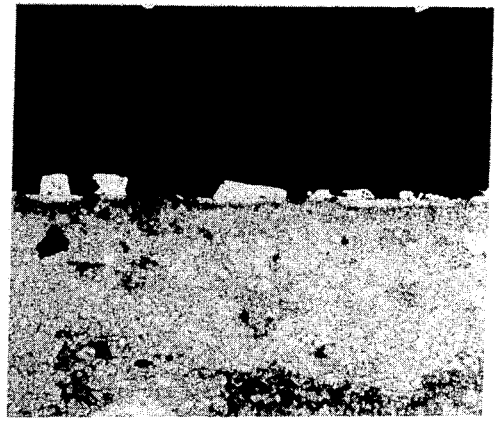
FIGS. 10 and 11 are photomicrographs with enlargements of 100 and 800 times, respectively, showing the junction between a deposited particulate material and a substrate.
Figure 11:
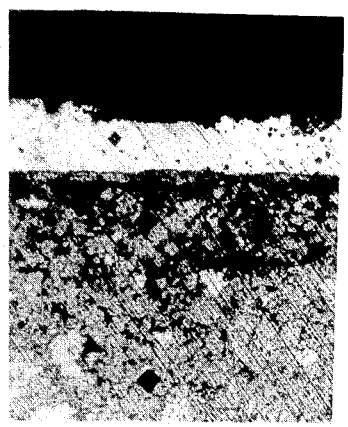

In an arrangement similar to that of FIG. 9, tungsten-carbide powder 90 having a particle size of about 0.1 mm, was disposed in a polyethylene tube 91 having a wall thickness of 0.2 mm and an inside diameter of about 25 mm. A fusible copper wire 93 was passed axially through the tube and had a diameter of about 0.12 mm. The wire, tube and workpiece 94 had a length of about 10 mm, the workpiece being composed of S55C carbon steel having a carbon content of 0.55 percent by weight. The detonation assembly was disposed at a distance 95 of 15 mm from the surface of the workpiece in a chamber such as that shown in FIG. 3 and was maintained at a reduced pressure of $10^{-2}$ mm of mercury. After an electric current was passed through the wire sufficient to melt it and cause a discharge with an energy of 3,000 joules, the deposit 96 upon the surface of the workpiece was measured. The deposit was found to have a thickness of 0.06 mm and to cover a width of the workpiece (i.e., transverse to the major dimension of the wire) of about 50 mm, the central 25 mm of which was a continuous zone while the outer 12.5 mm on each side was discontinuous as illustrated in FIG. 10, in which the iron substrate is seen to have particles of tungsten carbide disposed thereon. The magnification of 100 times shows the tungsten carbide of FIG. 10 to be firmly bonded to the substrate although somewhat discontinuous. A section through the center region (enlarged 800 times) is shown in FIG. 11 from which it can be seen that the particles of tungsten carbide penetrate deeply into the surface of the substrate and are anchored firmly thereon, in a continuous layer. The roughness of the surface at the central portion was found to be 3 microns ($H_{max}$). The discharge pulse had a duration of about 85 microseconds. The hardness $H_V = 2,100$ (on the Vickers scale).

Figure 8:
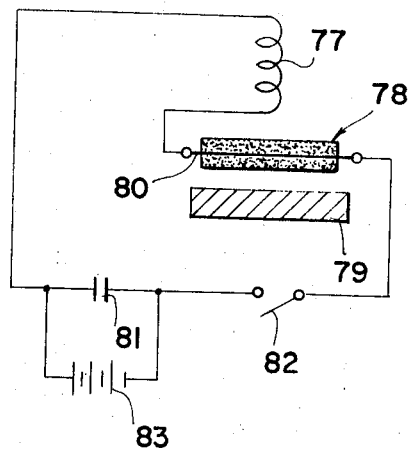
FIG. 8 is a diagrammatic elevational view, partly in section, showing a magnetic-deflection arrangement.

When the arrangement of FIG. 8 was employed using a magnet having four to five turns with a current ranging between 1,000 and 5,000 amperes, the layer of tungsten carbide was found to have the same hardness but a thickness of 0.1 mm and a roughness of 3 – 4 microns $H_{max}$ in both cases; the velocity of the particles range between 100 m/sec and 5 km/sec.

Figure 12:
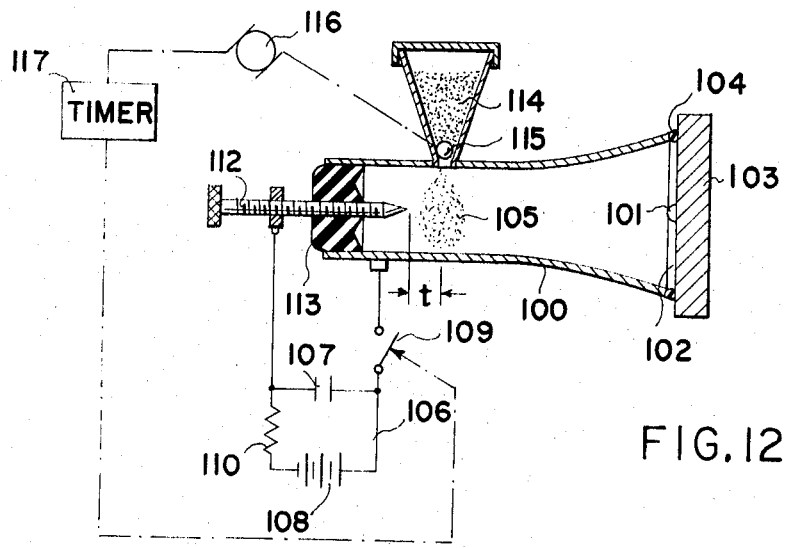
FIG. 12 is an axial cross-sectional view of an apparatus embodying the principles of my present invention in accordance with a modification thereof.

In the system of FIG. 12, the discharge chamber is formed as a barrel 100 whose mouth 101 is trained at the surface 102 of a substrate 103 which can be either conductive or non-conductive, as described earlier. A gap 104 is provided around the zone of the surface 102 surrounded by the barrel 100 to prevent pressure increases therewithin from reducing the kinetic energy of the particles projected against the surface 103. At the other end of the barrel 100, an insulating block 113 receives a needle-type electrode 112 which can be threaded into the barrel 100 axially to a variable distance $t$ from the region at which a hopper 114 feeds the pulverulent material 105 into the barrel transversely. The hopper 114 is provided with a feeding or metering mechanism 115 whose motor 116 is driven intermittently by a timer 117 which also controls a switch 109 in the supply circuit for the facing "gun." The supply circuit 106 comprises a direct-current source (shown as a battery 108) across which is bridged a capacitor 107 in series with a charging resistor 110. The distance $t$ is adjusted in this embodiment until closure of switch 109 will result in a discharge behind the mass of particles 105 whose presence modifies the breakdown voltage which must be applied between the needle 112 and the barrel 100 across which the pulsing source 106 is connected. When larger quantities of conductive powder 105 are supplied in the region of needle 112, the breakdown voltage is reduced and rapid pulses can be supplied so that a train of discharges at a repetition frequency determined by the timer 117 and synchronized with the particle feed means can drive these particles against the surface 102. In general, the discharge takes place rearwardly of the particle mass 105 and among these particles to partially ionize them, strip their oxide films and effect direct transfer of kinetic energy to the particles. It will also be understood that the timer means need not be used inasmuch as closure of switch 109 will apply a given potential between the needle 112 and the barrel 100 and the firing of the discharge can be initiated either by advancing the needle 112 or by introducing a sufficiently large mass of the particles 105.

In the modification of FIG. 13, the barrel 200, trained upon the substrate 203 with a clearance 204 to prevent excess static pressure buildup in the barrel, is provided with feed means including a supply roll 219 for a foil 220 of a conductive material. The chamber 221 is formed at least in part by a barrel portion 222 electrically insulated from a needle 212 which can be advanced by a motor 223 or hydraulic means as illustrated in greater detail in FIG. 14. A pulse source such as that illustrated at 106 in FIG. 12 can be connected across the needle 212 and a basket-shaped counterelectrode 224 just behind the foil 220. Thus the foil 220 constitutes a frangible diaphragm sealing the open end of chamber 221 and carrying a mass of, for example, nonconductive or partially nonconductive particles 205. Upon discharge across the gap between the needle 212 and the counter-electrode 224, the shock wave destroys the diaphragm 220 and propagates the particles 205 against the surface 203 to form a coherent layer 225 thereon. It will be understood that the counterelectrode 224 can be omitted and the corresponding terminal of the pulse source 206 connected to the foil 220 so that the latter may serve as the counterelectrode as illustrated in FIG. 13A.

EXAMPLE II

Using an apparatus of the type illustrated in FIG. 13, the foil 220 was a nickel-and-metal foil having a thickness of approximately 0.006 mm. The particle mass was constituted by equal proportions of 300-Mesh tungsten carbide and 600-Mesh synthetic diamond. Five grams of the particle mixture were placed upon the foil and a discharge with an energy of 8,000 joules was applied at the needle 212. The workpiece was a 0.55 percent by weight carbon steel (S55C) and the coated surface was a distance of 12 mm from the foil. About 4 grams of the particles were found to be strongly adherent to the workpiece. Corresponding results were obtained when the particles were composed of silicon carbide, aluminum nitride, boron nitride and titanium carbide. When the workpiece was replaced by an aluminum foil it was found that deposition of titanium and tantalum particles was readily carried out with the same discharge energy and device.

In a modification of the system of Example II, the particles specified therein were mixed with a binder to form a disk which was placed upon the foil 220. Binders tested for this purpose included cellulose propionate, paraoxybenzaldehyde, allyl-alcohol resin and hard rubber. In all cases the binder was present in an amount just sufficient to hold the mass together and it was found that the shock wave resulted in a penetration of the particles into the body as individual and discrete units in spite of their bound state prior to the discharge. Penetration of the particles was improved by incorporating stoichiometric equivalents of chromic oxide and of reducing binders of the character described.

In the system of FIG. 14, the barrel 300 extends into a coating chamber 330 lined with a sound-damping elastomeric material 331 such as foam rubber. The chamber 330 is vented through a muffler 332 and is provided with a cross-feed support 333 for the workpiece 303. The cross feed includes spindles 334 and 335 for longitudinal and transverse displacement of the workpiece 303. The upper part of the barrel 322 is separated from the lower portion 300 by insulating spacers 336 upon which the foil 320 is mounted. The foil carries the mass 305 of particles and is here disposed within the chamber 321 in which the spark is generated. The needle 312 passes through an insulating bushing 313 and is connected with a supply network 306 of the type illustrated in FIG. 12. The firing control of the system is here regulated by a hydraulic motor 323 whose piston 337 is connected with the needle 312 for hydraulically advancing same. A distributing valve 338 in circuit with a hydraulic pump 339 and a reservoir 340 provides the necessary regulation of a hydraulic device 323. When the electrode needle 312 approaches the foil 320 sufficiently, a discharge results in rupture of the foil diaphragm and the propagation of the particles against the workpiece 303. The discharge can also be initiated by the operation of a compressed-air source 341 designed to blow a stream of air into the chamber 321 and stir the particles therein to effect a breakdown between the electrode and the foil.

Figure 15:
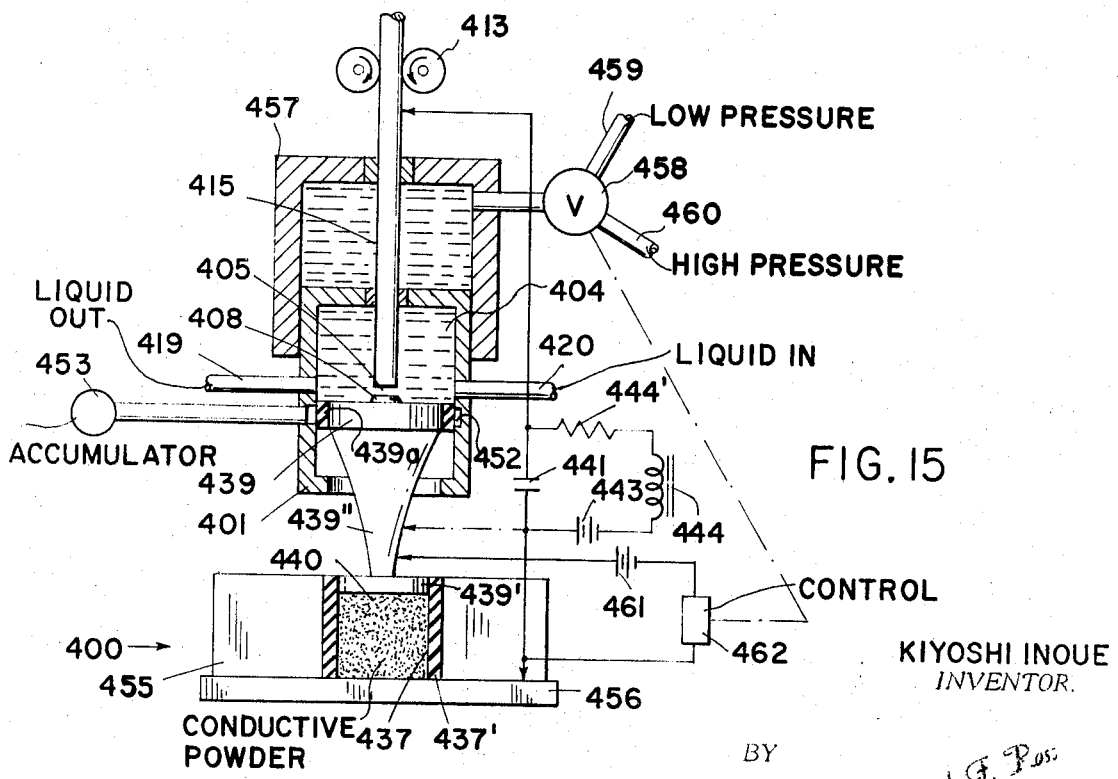
FIG. 15 is a cross-sectional view through a system in which the particles are bonded together by the impulsive energy.

In FIG. 15 the device 400 comprises a fluid receptacle 401 which itself constitutes the piston of a hydraulic cylinder 457. Inlet and outlet tubes 420 and 419 circulate the liquid medium 404 within vessel 401 via a filter. A piston 439 is slidably displaceable within vessel 401 and is provided with an insulating lining 439a. Piston 439 carries a deposit 408 of electrode material and thus constitutes one of the electrodes forming the spark gap 405, the other electrode being a rod or wire 415 adapted to be fed into vessel 401 by rollers 413 in response to an alteration in the size of the spark gap. A vibratile bar 439'', whose resonant frequency is approximately equal to the resonant frequency of the discharge across gap 405, connects piston 439 with a plate 439' for compression of a conductive powder 440 retained within the cavity 437 of an electrically insulating sleeve 437' which is reinforced by ribs 455 and mounted upon the metal plate 456. The two-position valve 458 is connected in series with the hydraulic cylinder 457 and is supplied by a low-pressure conduit 459 and a high-pressure conduit 460, valve 458 being operated by a control circuit 462 in response to the voltage drop across the mass of particles 440; a battery 461, in series with the control circuit 462, provides the necessary current for circuit 462. The discharge energy is supplied by a capacitor 441 connected between plate 456 and electrode 415, capacitor 441 being bridged by a battery 443 in circuit with an inductance 444 and a resistance 444'. Vessel 401 is provided with an annular recess 452, normally blocked by piston 439, which communicates with a high-pressure accumulator 453.

When conductive particles are employed, capacitor 441 discharges to develop simultaneous sparks at gap 405 and through the particle mass, thereby forming conductive bridges among the particles. The shock wave within vessel 401 rebounds against the piston 439 so that the force of this piston compresses the conductive powder at the conclusion of the electrical discharge. Simultaneously, control 462 senses the decreased voltage drop across the mass of particles and energizes valve 458 to cut off the low-pressure fluid supply to cylinder 457, which formerly displaced vessel 401 to follow the shrinkage of the particle mass, and cut in the high-pressure conduit. The conductive powder, now sintered into a porous mass but still in a plastic state, is thus subjected to the additive pressure of source 460 and the pressure wave within vessel 401. When nonconductive particles are used, capacitor 441 is connected to the piston 439 as indicated by the dot-dash conductor 463 whereupon the pressure of the discharge at gap 405 is applied to the particles without initial formation of bridges across them by electrical discharge.

EXAMPLE III

A mass of polytetrafluorethylene particles of 200-Mesh are disposed in a nonconductive sleeve having a diameter of 15 mm and a length of 2 cm. Light pressure was applied at hydraulic cylinder 457 to compress the particles (approximately 1 kg/cm$^2$) while a discharge in silicone oil within vessel 401 was created. Electrodes composed of an aluminum-copper alloy were used while the single discharge pulse had a duration of 150 microseconds and an energy of 1,500 joules. The resulting coherent body had all of the characteristics of a body molded at elevated temperatures although the powder was held at room temperature for the duration of the process.

EXAMPLE IV

The procedure of Example III was followed, except that nickel particles and a spark energy of 5,000 joules was used between plate 456 and electrode 415. The pressure applied by cylinder 457 to the particles was 1 kg/cm$^2$, this pressure being followed upon reduction of the voltage drop across the mass of particles to a value of 500 kg/cm$^2$, the discharge terminating concurrently with the increase in pressure. The resulting body had the density of greater than 90 percent of that of the solid mass.

The invention described and illustrated is believed to admit of many modifications within the ability of persons skilled in the art, all such modifications being considered within the spirit and scope of the appended claims.

I claim:

1. A method of forming coherent bodies from a pulverulent material, comprising the steps of:
   a. juxtaposing a pair of electrodes in spaced relationship with one another for producing a shock wave upon energization;
   b. providing a mass of particulate material in close proximity to at least one of said electrodes and in substantially a straight-line path between them for activation by said electrodes and propulsion of said material by said shock wave upon the formation of a discharge across said electrodes, said mass being at least in part within the discharge;
   c. positioning a substrate ahead of said mass of material in said direction whereby a surface of said substrate is disposed for impingement of said particulate material thereon upon the generation of a spark discharge between said electrodes while maintaining a noncombustible gaseous environment between said electrode and said substrate; and
   d. energizing said electrodes by applying an electric pulse thereto to generate an impulsive spark discharge between said electrodes and propel said material in the direction of said substrate and form a coherent mass of said material thereon.

2. A method of forming coherent bodies fom a pulverulent material, comprising the steps of:
   a. juxtaposing a pair of electrodes in spaced relationship with one another for producing a shock wave upon energization;
   b. providing a mass of particulate material in close proximity to at least one of said electrodes for activation thereby and propulsion of said material by said shock wave upon the formation of a discharge across said electrodes, said mass being at least in part within the discharge;
   c. positioning a substrate ahead of said mass of material in said direction whereby a surface of said substrate is disposed for impingement of said particulate material thereon upon the generation of a spark discharge between said electrodes while maintaining a noncombustible gaseous environment between said electrode and said substrate; and d. energizing said electrodes by applying an electric pulse thereto to generate an impulsive spark discharge between said electrodes and propel said material in the direction of said substrate and form a coherent mass of said material thereon, said mass being admixed with a binder and forming an explodable sheath surrounding said electrodes prior to the generation of said discharge.

3. A method of forming coherent bodies from a pulverulent material, comprising the steps of:
 a. juxtaposing a pair of electrodes in spaced relationship with one another for producing a shock wave upon energization;
 b. providing a mass of particulate material in close proximity to at least one of said electrodes for activation thereby and propulsion of said material by said shock wave upon the formation of a discharge across said electrodes, said mass being at least in part within the discharge;
 c. positioning a substrate ahead of said mass of material in said direction whereby a surface of said substrate is disposed for impingement of said particulate material thereon upon the generation of a spark discharge between said electrodes while maintaining a noncombustible gaseous environment between said electrode and said substrate; and
 d. energizing said electrodes by applying an electric pulse thereto to generate an impulsive spark discharge between said electrodes and propel said material in the direction of said substrate and form a coherent mass of said material thereon, said electrodes being initially bridged by an electrically destructible conductor adapted to explode upon the application of an electrical pulse, said method further comprising the step of explosively destroying said conductor by incipient passage therethrough of the electrical pulse forming said discharge to form an electrode gap sustaining said discharge during the remainder of said pulse, said mass being at least in part created by destruction of said conductor.

4. A method of forming coherent bodies from a pulverulent material, comprising the steps of:
 a. juxtaposing a pair of electrodes in spaced relationship with one another to form an impulse generator;
 b. disposing a mass of pulverulent material in force-receiving relationship with said generator;
 c. positioning a substrate in force-receiving relationship with said generator whereby a surface of said substrate is disposed for impingement of said pulverulent material thereon upon the generation of a spark discharge between said electrodes, said particles being supported between at least one of said electrodes and said surface in a layer substantially parallel thereto upon a rupturable electrically conductive diaphragm forming the other electrode; and
 d. energizing said electrodes by applying an electric pulse thereto to generate an impulsive spark discharge and shock wave between said electrodes of an intensity sufficient to cause impingement of said pulverulent material upon said substrate and to bond said pulverulent material into a coherent mass on said substrate, said electrodes being spacedly juxtaposed in a gaseous environment.

5. The method defined in claim 4 wherein said pulverulent material is constituted as a relatively loose mass of particles.

6. The method defined in claim 4, further comprising the step of heating said mass of pulverulent material independently of said spark discharge to facilitate adhesion thereof to said substrate.

7. The method defined in claim 6 wherein said pulverulent material is heated prior to the impingement of said mass against said substrate by admixing with said mass prior to said spark discharge at least one chemical compound capable of exothermic reaction in said mass, said exothermic reaction being initiated at least in part by the said discharge.

8. The method defined in claim 4, further comprising the step of directing the shock wave generated at said electrodes toward said surface by applying an electromagnetic force field to said discharge.

9. The method defined in claim 4 wherein a multiplicity of impulsive discharges are generated at said electrodes, further comprising the step of sweeping said generator over said surface during said multiplicity of discharges.

10. The method defined in claim 4, further comprising the step of evacuating the space between said mass and said surface.

11. A method of forming coherent bodies from a pulverulent material, comprising the steps of:
 a. juxtaposing a pair of electrodes in spaced relationship with one another to form an impulse generator adapted to produce a shock wave;
 b. positioning a substrate in force-receiving relationship with said generator whereby a surface of said substrate is exposed to said shock wave and disposed for impingement of pulverulent material propelled thereby;
 c. disposing a mass of a pulverulent material in force-receiving relationship with said generator and in the form of a relatively loose mass of particles supported on a solid surface between at least one of said electrodes and said surface in a layer substantially parallel thereto; and
 d. energizing said electrodes by applying an electric pulse thereto to generate an impulsive spark discharge between said electrodes at least in part through said mass of pulverulent material and of an intensity sufficient to propel said particles against said substrate and to bond said pulverulent material into a coherent mass thereon, said electrodes being spacedly juxtaposed in a noncombustible gaseous environment.

12. The method defined in claim 11, further comprising the step of heating said mass of pulverulent material independently of said spark discharge to facilitate the adhesion thereof to said substrate.

13. The method defined in claim 12 wherein said pulverulent material is heated independently of said spark discharge and prior to the impingement of said mass against said substrate by admixing with said mass prior to said spark discharge at least one chemical compound capable of exothermic reaction in said mass, said exothermic reaction being initiated at least in part by the said discharge.

14. The method defined in claim 11, further comprising the step of directing the shock wave generated at said electrodes toward said surface by applying an electromagnetic force field to said discharge.

15. The method defined in claim 11 wherein a multiplicity of impulsive discharges are generated at said electrodes, further comprising the step of sweeping said generator over said surface during said multiplicity of discharges.

16. The method defined in claim 11, further comprising the step of evacuating the space between said mass and said surface.

17. An apparatus for forming coherent bodies from a particulate material, comprising:
 an impulse generator provided with a pair of electrodes in spaced relationship with one another;
 means for disposing a mass of said particulate material in close proximity to the electrodes of said generator;
 circuit means for energizing said electrodes by applying thereto an electric pulse to generate an impulsive spark discharge between said electrodes of an intensity sufficient to bond said particulate material into a coherent mass;
 housing means open in the direction of a substrate adapted to receive a layer of said particulate material and containing said generator; and
 solid support means for said particulate material in said housing means between at least one of said electrodes and a surface of said substrate adapted to receive said layer.

18. An apparatus as defined in claim 17 wherein said electrodes are initially bridged by a fusible conductor destructible upon incipient passage of an electrical pulse to form a discharge gap between said electrodes.

19. An apparatus as defined in claim 17, further comprising means for at least partially evacuating said housing means intermediate said generator and said surface.

20. An apparatus as defined in claim 17, further comprising means for applying an electromagnetic force field across the region between said generator and said surface for directing the shock wave produced by said discharge.

21. An apparatus as defined in claim 17, further comprising means for shifting the electrode gap defined between said electrodes and said surface relatively in a direction parallel to the latter.

22. An apparatus for forming coherent bodies from a pulverulent material, comprising an impulse generator provided with a pair of electrodes in spaced relationship with one another; means for disposing a mass of said pulverulent material in force-receiving relationship with said generator; circuit means for energizing said electrodes by applying thereto an electric pulse to generate an impulsive spark discharge between said electrodes of an intensity sufficient to bond said pulverulent material into a coherent mass; housing means open in the direction of a substrate adapted to receive a layer of said pulverulent material and containing said generator; and support means for said pulverulent material in said housing means between at least one of said electrodes and a surface of said substrate adapted to receive said layer, said support means being formed as a foil extending parallel to said surface and defining a frangible diaphragm between said generator and said surface, said diaphragm retaining said mass.

23. An apparatus as defined in claim 22 wherein said foil is electrically conductive and forms the other of said electrodes.

24. An apparatus as defined in claim 23 wherein said mass is disposed as a loose layer of conductive particles upon said foil between said one electrode and the foil, said apparatus further including means for directing a stream of gas against said mass to entrain said particles and initiate said discharge.

25. An apparatus as defined in claim 22 wherein said foil forms a sleeve for a sheath of said pulverulent material surrounding said electrodes.

* * * * *